(12) United States Patent
Schellhorn

(10) Patent No.: US 7,010,510 B1
(45) Date of Patent: Mar. 7, 2006

(54) VARIANCE REDUCTION TECHNIQUE FOR LARGE SCALE RISK MANAGEMENT

(75) Inventor: Henry Schellhorn, Encino, CA (US)

(73) Assignee: Oracle International Corporation, Redwood Shores, CA (US)

( * ) Notice: Subject to any disclaimer, the term of this patent is extended or adjusted under 35 U.S.C. 154(b) by 872 days.

(21) Appl. No.: 09/614,427

(22) Filed: Jul. 12, 2000

(51) Int. Cl.
G06F 17/60 (2006.01)

(52) U.S. Cl. .............................. 705/36; 705/35; 705/7
(58) Field of Classification Search ................ 705/7, 705/35, 36
See application file for complete search history.

(56) References Cited

U.S. PATENT DOCUMENTS

| | | | | |
|---|---|---|---|---|
| 6,058,377 A | * | 5/2000 | Traub et al. ................. | 705/36 |
| 6,061,662 A | * | 5/2000 | Makivic ...................... | 705/36 |
| 6,772,136 B1 | | 8/2004 | Kant et al. | |

FOREIGN PATENT DOCUMENTS

WO  WO 00/21011  *  4/2000

OTHER PUBLICATIONS

Glasserman et al "Asmptotically Optimal Importance Sampling and Stratification for pricing Path-Dependent Options" Mathematical Finance, vol. 9, No. 2 (Apr. 1999) pp. 117-152.*
Barraquand, J., "Numerical Valuation of High Dimensional Multivariate European Securities," Management Science, vol. 41, No. 12 (Dec. 1995), pp. 1882-1891.
Bratley, P. et al., "Algorithm 659—Implementing Sobol's Quasirandom Sequence Generator," ACM Transactions on Mathematical Software, vol. 14, No. 1 (Mar. 1988), pp. 88-100.
Caflisch, R.E. et al., "Valuation of Mortgage-Backed Securities Using Brownian Bridges to Reduce Effective Dimension," Journal of Computational Finance, vol. 1, No. 1 (1997), pp. 27-46.
Carverhill, A. et al., "Quicker on the Curves," Over the Rainbow—Developments in Exotic Options and Complex Swaps, Risk Publications (1995), pp. 325-327.
Fishman, V. et al., "Hybrid Low-Discrepancy Sequences: Effective Path Reduction For Yield Curve Scenario Generation," The Journal of Fixed Income, vol. 7, No. 1 (Jun. 1997), pp. 75-84.
Hull, J. et al., "Finding the Keys," Over the Rainbow—Developments in Exotic Options and Complex Swaps, Risk Publications (1995), pp. 215-218.
Joy, C. et al., "Quasi-Monte Carlo Methods in Numerical Finance," Management Science, vol. 42, No. 6 (Jun. 1996), pp. 926-938.
Kuruganti, I. et al., "Importance Sampling For Markov Chains: Computing Variance and Determining Optimal Measures," Proceedings of the 1996 Winter Simulation Conference, pp. 273-280.
Morokoff, W. et al., "Quasi-Random Sequences and Their Discrepancies," Siam. J. Sci. Comput., vol. 15, No. 6 (Nov. 1994), pp. 1251-1279.

(Continued)

Primary Examiner—Jagdish N. Patel
Assistant Examiner—Narayanswamy Subramanian
(74) Attorney, Agent, or Firm—Bingham McCutchen LLP

(57) ABSTRACT

A control variate Monte Carlo simulation for estimating the value of a portfolio of financial instruments is provided. The control variate uses a function dependent upon two state variables, the aggregate principal and the interest rate, to simulate the aggregate value of the portfolio.

36 Claims, 5 Drawing Sheets

OTHER PUBLICATIONS

Newton, N.J., "*Variance Reduction for Simulated Diffusions,*" Siam J. Appl. Math., vol. 54, No. 6 (Dec. 1994), pp. 1780-1805.

Owen, A.B., "*Monte Carlo Variance of Scrambled Net Quadrature,*" Siam J. Numer. Anal., vol. 34, No. 5 (Oct. 1997), pp. 1884-1910.

Spanier, J. et al., "*Quasi-Monte Carlo Methods for Integral Equations,*" Proceedings of a Conference at the University of Salzburg, Austria, Jul. 9-12, 1996 (1998), pp. 398-414.

Spanier, J. et al., "*Quasi-Random Methods For Estimating Integrals Using Relatively Small Samples,*" Siam Review, vol. 36, No. 1 (Mar. 1994), pp. 18-44.

Duffie, Darrell, "Dynamic Asset Pricing Theory" *Princeton University Press* (1996) 2$^{nd}$ Ed., p. 146-149.

Hull, John, "Options, Futures, and Other Derivatives," *Prentice-Hall* (1997) 4$^{th}$ Ed., Chapter 21.12, p. 580-591.

Schellhorn, H. et al., "Variance Reduction Techniques for Large Scale Risk Management," *Monte Carlo and Quasi Monte-Carlo Methods* (1998), Springer 2000, p. 419-435.

Oracle® Risk Manager Reference Guide, Release 4.0, Part No. A68684-01 (1999).

Duffie, Darrell, "Dynamic Asset Pricing Theory", 1996, 2$^{nd}$ Ed., Princeton University Press, Princeton, NJ.

Fabozzi, Frank J. et al., "Mortgage and Mortgage-Backed Securities Markets", 1992, Harvard Business School Press, Boston, MA.

Glasserman, Paul J. et al., "Asymptotically Optimal Importance Sampling and Stratification for Pricing Path Dependent Options", Apr. 1999, pp. 117-152, Mathematical Finance, vol. 9, No. 2.

Hull, John C., "Options, Futures & Other Derivatives", 2000, 4$^{th}$ Ed., Prentice Hall, Upper Saddle River, NJ.

Jamshidian, R., "Bond and Option Evaluation in the Gaussian Interest Rate Model", 1989, Financial Strategies Group, Merril Lynch Capital Markets, New York.

Lord, Graham et al., "Using Low-Discrepancy Points to Value Complex Financial Instruments", Contingencies, Sep./Oct., 1996, pp. 52-58.

Niederreitter, Harald, "Random Number Generation and Quasi-Monte Carlo Methods", Regional Conference Series in Applied Mathematics, 1992, Society for Industrial and Applied Mathematics, Philadelphia, PA.

Press, William H. et al., "Numerical Recipes in C: The Art of Scientific Computing", 1992, 2$^{nd}$ Ed., Cambridge University Press, Cambridge, UK.

* cited by examiner

- Prior Art -

VARIANCE REDUCTION TECHNIQUE FOR LARGE SCALE RISK MANAGEMENT

FIELD OF THE INVENTION

This invention relates to methods for accelerating the convergence of Monte Carlo simulation for pricing portfolios of loans, mortgages or related financial instruments.

DESCRIPTION OF RELATED ART

Financial institutions may carry large portfolios of mortgages and loans, numbering even in the millions of financial instruments. To evaluate the value of such portfolios, a number of Monte Carlo simulations are commercially available such as in the Oracle OFSA/Risk Manager software package. This particular software package is currently used by many large banks for evaluating their portfolios of mortgages, loans and deposits in what is called Asset and Liability Management (ALM). Speed is a key concern for ALM packages for a number of reasons.

For example, estimating the value of such a portfolio using a Monte Carlo simulation with a single representative instrument is very inaccurate; therefore all instruments (which may number in the millions) are often processed individually by the simulation before accumulating the results. In addition, prepayment assumptions can be specified in a very sophisticated manner (at least in the OFSA/Risk Manager), which slows down the computations. Because of these factors, prior art Monte Carlo simulations tended to minimize the number of scenarios used while maintaining a satisfactory degree of accuracy.

A particularly difficult financial problem involves the evaluation of a portfolio of fixed rate mortgages, which are perhaps the most complicated of all banking instruments because of the path-dependency of amortization and prepayment. A simple Monte Carlo simulation of such a portfolio may require many thousands of samples before the simulation converges on a result with a suitable degree of accuracy. A number of variance reduction techniques may be used to reduce the required number of samples/scenarios used in a Monte Carlo simulation, including numerical integration using low discrepancy sequences (LDS) or control variates. The latter technique has not proven as popular as LDS or antithetic variables for several reasons. For instance, these techniques require an estimation phase to extract information about the system, adding overhead to the calculations. If only a few mortgages are in the portfolio, this extra overhead can be comparable to the time required to process the system with a simple Monte Carlo simulation.

These considerations do not apply, however, in evaluating a large portfolio. The computational overhead of a control variate technique is dwarfed by the sheer time of calculating the cash flows of a large portfolio. Also mortgages do not change very much with time. This means practically that one could estimate today's portfolio based on information from yesterday's portfolio, easing the estimation task of a control variate technique. Thus, there is a need in the art for improved control variate techniques that reduce the amount of scenarios required for a Monte Carlo simulation to converge to an answer or desired result.

SUMMARY OF THE INVENTION

The invention provides in one aspect a control variate technique for Monte Carlo simulation of the value of a portfolio of financial instruments. The control variate is formed by a linear combination of an estimated value for the portfolio, an estimated aggregate value the portfolio, and an expected value of the estimated aggregate value. To derive the approximate simulated portfolio, a number of Monte Carlo samples are used to interpolate functions representing the approximate principal and approximate cashflow for the portfolio.

Other and further advantages of the invention will be further understood and appreciated by those skilled in the art by reference to the following specification, claims and drawings.

BRIEF DESCRIPTION OF THE DRAWINGS

The accompanying drawings, which are incorporated in and constitute a part of the specification, illustrate preferred embodiments of the invention, and together with the description, serve to explain the principles of the invention. Similar reference characters denote corresponding features consistently throughout the drawings.

DETAILED DESCRIPTION

Figure 1:
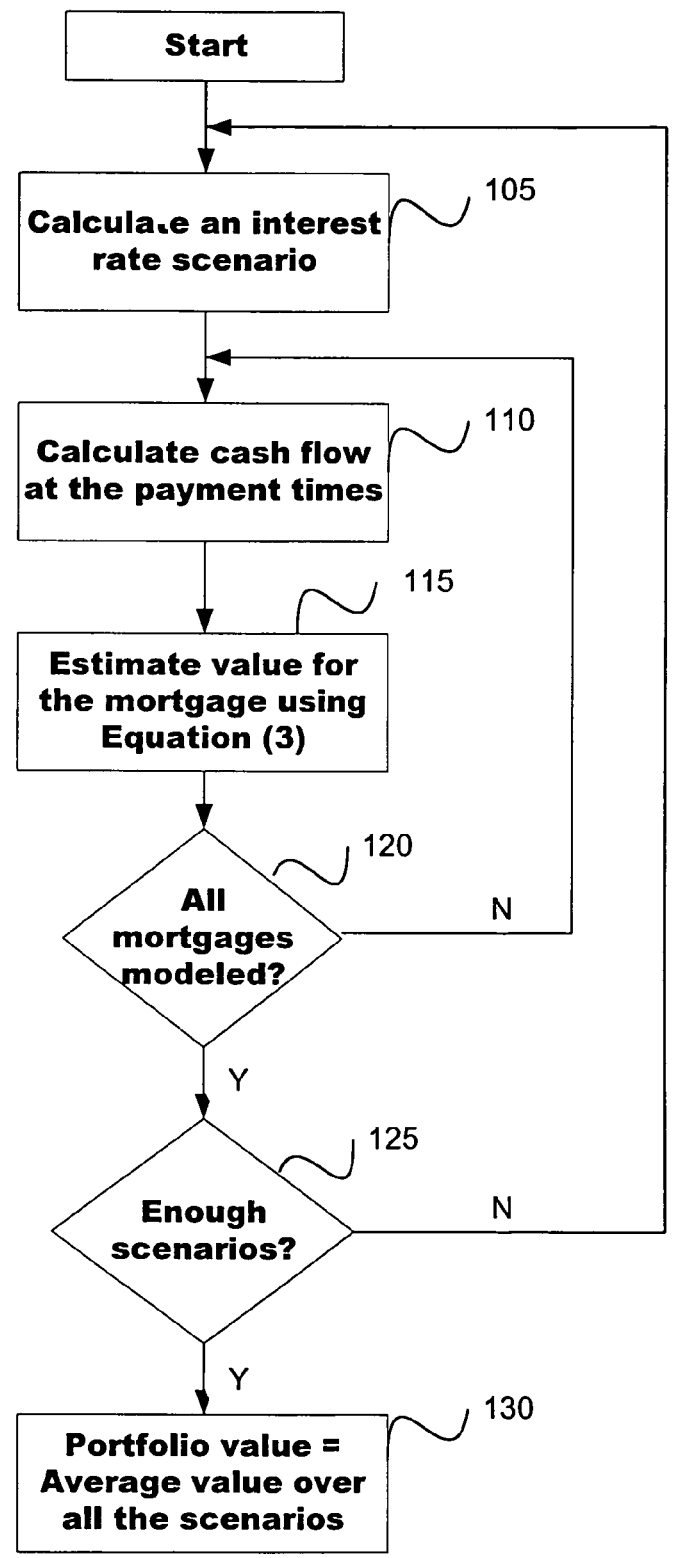
FIG. 1 is a flowchart of a simple Monte Carlo simulation.

The control variate technique of the invention may be used to calculate the market value, or price (at time zero) of a portfolio of mortgages. By definition the market value $V_0$ of the portfolio is the sum of the market values $V_0^j$ of each mortgage. As will be shown herein, this market value may be represented by an expected value of a stochastic integral. The integrand will depend upon the (risk-free) interest rate as well as the financial characteristics of the particular mortgage such as its coupon rate and the starting principal. To estimate a value for the integral, the integrand is sampled over the payment times of the mortgage. Various stochastic models or term structures may be used to generate the interest rates at these payment times. In a simple Monte Carlo simulation, values or samples of the integrand are calculated using an interest rate scenario produced by sampling a stochastic interest rate model with a pseudo-random number produced by a pseudo-random number generator. Multiple scenarios are produced and averaged to estimate the market value of the portfolio.

A popular stochastic model or term structure for the risk-free interest rate r is the Hull and White one-factor model. The stochastic differential equation (SDE) for the Hull and White one-factor model is given by:

$$dr_t = (\theta_t - ar_t)dt + \sigma dW_t \qquad (1)$$

where $a, \sigma$ are constants, $W$ is one-dimensional Brownian motion in the risk-neutral measure, and $\theta$ is a deterministic function of time that optimally fits the current yield curve. This means that given $K$ observable discount bond prices $P(T_k)$ for $k=1, \ldots, K$, a perfect choice of $\theta$ would result in:

$$P(T_k) = E\left[e^{-\int_0^{T_k} r_s ds}\right] \quad k = 1, \ldots, K \qquad (2)$$

where E denotes time-zero expectation in the risk-neutral measure. By standard no-arbitrage arguments, the price of each mortgage then satisfies:

$$V_0^j = E\left[\sum_{i=1}^n e^{-\int_0^{T_i^j} r_s ds} C^j(T_i^j)\right] \qquad (3)$$

where $T_i^j$ are payment times, the cash flows $C^j(T_i^j)$ are $F_{T_i^j}$ measurable random variables that depend on mortgage characteristics, and n is the number of payments times required to retire the mortgage. Consider the case of fixed rate mortgages with prepayment optionalities. For convenience of notation but without loss of generality, it may be assumed that the maturity of each mortgage is T=30 years, and that the initial principal of each mortgage of the pool is the same. However, a typical mortgage portfolio consists of mortgages issued at different dates in the past, resulting in distinct values for the outstanding principal at time zero $\pi^j$ of each mortgage. Moreover, the coupon rate $\rho^j$ is different for each mortgage.

A Monte Carlo simulation is currently the most popular technique to calculate a value for equation (3). In that methodology, practitioners need to empirically estimate prepayment behavior. The most general endogenous model of prepayment is that of a functional of the rate, i.e. the time-t prepayment rate is a functional $\gamma_t$: $C([0,t],\Re)\Re_+^2 \to \Re_+$, where $C([0,t],\Re)$ is the space of $\Re$-valued continuous functions of t. This prepayment model captures path-dependent behavior such as burnout and index lags. An example prepayment model is described further herein. The cash flow rate per unit of time $\overline{C}^j$ and principal p follow then as:

$$\overline{C}_t^j = \begin{cases} \dfrac{\rho^j e^{\rho^j T}}{e^{\rho^j T} - 1} + \gamma_t(r, \rho^j, \pi^j) p_t^j & \text{if } p_t^j \geq 0 \\ 0 & \text{otherwise} \end{cases} \qquad (4)$$

$$\frac{dp_t^j}{dt} = -\frac{\rho^j e^{\rho^j T}}{e^{\rho^j T} - 1} + \rho^j p_t^j - \gamma_t(r, \rho^j, \pi^j) p_t^j \qquad (5)$$

with $p_0^j = \pi^j$.

In a Monte Carlo simulation, the integral of equation (3) is sampled at discrete points to estimate its value. Thus, equations (1) and (4) must be discretized also. The Euler scheme may be used to discretize equation (1). Calculating a discrete cash flow from equation (4) is described by F. Fabozzi and F. Modigliani, *Mortgage and Mortgage-backed Securities Markets*, Harvard Business School Press, 1992. The total cashflow rate C is the sum of each mortgage cash flow rate and the total principal p is the sum of each mortgage principal.

A flowchart for a simple, prior art Monte Carlo simulation of equation (3) is illustrated in FIG. 1. After starting the simulation, a random number generator generates a pseudo-random number to initiate the calculation of an interest rate scenario at step 105. For example, if the simulation is being implemented in C++, the function random_fraction( ) will provide a random number in the closed interval [0, . . . 0.1]. Because a computer cannot generate a truly random number, the number is merely pseudo-random. With the appropriate weighting to maintain the required probability density, the pseudo-random number is plugged into the stochastic interest rate model at to generate interest rate samples at the payment times of the mortgage being evaluated. The stochastic interest rate model or term structure may be a discretized version of equation (3). Alternatively, other interest rate models may be used such as the Rendleman and Bartter model, the Vasicek model, or Hull and White two-factor model. Rather than use a pseudo-random number, LDS values could also be used in the stochastic interest rate model in step 105 to generate the interest rate samples such as described in U.S. Pat. No. 5,940,810, the contents of which are hereby incorporated by reference as if fully set forth herein. At step 110, the interest rate samples and financial characteristics of the mortgage, such as its starting principal and coupon rate, are used to generate cash flow values at the payment times. These values are used to calculate samples of the integrand in equation (3) to estimate, for one scenario in the Monte Carlo simulation, the value for a particular mortgage at step 115. Steps 110 and 115 are repeated at step 120 until a value has been estimated for all the financial instruments in the portfolio.

The sum of all the values of all the mortgages calculated in step 120 provides an estimate of the value of the portfolio for one particular scenario in the Monte Carlo simulation. Many such scenarios must be repeated at step 125 depending upon the variance of the results. In a large portfolio, many different scenarios must be calculated before the simulation converges on a suitably accurate result. Because the process illustrated in FIG. 1 implements no variance reduction techniques, it may be denoted as a simple or crude Monte Carlo simulation.

A control variate technique reduces the number of scenarios required for a Monte Carlo simulation to converge upon a result. The Monte Carlo simulation discussed with respect to FIG. 1 may be generalized as providing an estimate of a function E(g(X)), where X is a random vector representing the interest rate samples at the payment times (a single Monte Carlo scenario). If another function f is derived whose expected value of f(X) is known, the convergence of the Monte Carlo simulation may be accelerated (assuming appropriate selection of a suitable f(X)) by calculating samples of a new function W:

$$W = (g(X) - f(X) + m) \qquad (6)$$

where m is the expected value of f(X). The function W may be denoted as the control variate. The inventor has discovered a control variate that converges to a result more than two orders of magnitude faster than a simple Monte Carlo simulation.

In the control variate technique of the invention, the function f(X) represents the value of an aggregated approximate portfolio. Note that it is much less time-consuming to simulate the approximate portfolio than the true portfolio because the former is aggregated. As used herein, when references are made to an "aggregated" value such as an "aggregated cash flow value," it will be understood that this refers to a value of the approximate portfolio, which does not simulate or model the financial instruments in the portfolio individually. To simulate the approximate portfolio, a functional form for its cash flow $\hat{C}_i$ and principal $\hat{p}_i$ for each month i (payment time) may be interpolated. The inventor has discovered that using two state variables, the interest rate and the approximate principal itself, provides a powerful control variate technique. The model of the approximate portfolio may be given by:

$$\hat{C}_i = \mu(r(i\Delta t), \hat{p}_i, i\Delta t) \quad (7)$$

$$\hat{p}_{i+1} = v(r(i\Delta t), \hat{p}_i, i\Delta t) \quad (8)$$

The functions $\mu$ and $v$ are determined by the information extracted in a first set of Monte Carlo scenarios, e.g., $\omega = 1, \ldots, 50$, using steps 105 through 125 in FIG. 1. Because these scenarios are used to model an aggregate portfolio, they may be denoted as "adaptive" scenarios. Note that the value of 50 scenarios is arbitrary. The number of scenarios required to approximate the functions $\mu$ and $v$ is substantially less, however, than the many thousands of scenarios required in a simple Monte Carlo simulation.

From equation (3), the control variate W is thus given by:

$$W = \sum_{i=1}^{n} e^{-\int_0^{T_i^j} r_s ds} C^j(T_i^j) - \sum_{i=1}^{n} e^{-\int_0^{i\Delta t} r_s ds} \hat{C}_i(\omega) - \sum_{i=1}^{n} E\left[ e^{-\int_0^{i\Delta t} r_s ds} \hat{C}_i \right] \quad (9)$$

where $\hat{C}_i(\omega)$ is given by equation (7) and represents the cash flow for the approximate portfolio in the ith month (or ith payment time). An examination of equation (7) shows the dependence of $\hat{C}_i(\omega)$ on the two state variables in the function $\mu$: the interest rate for the ith month, $r(i\Delta t, \omega)$, and the principal for the approximate portfolio at the ith month, $\hat{p}_i(\omega)$. Interpolating this function directly from the two state variables requires an interpolation in 3 dimensions. While such an interpolation can be done, there is a danger of overfitting the data in such a case.

Rather than interpolating in three dimensions, an interpolation in just two dimensions can be accomplished in the following manner. To decouple the dependence on the two state variables, the aggregate portfolio's cashflow for the ith month from only the payments (denoted as $\hat{C}_i^{pay}$) is distinguished from the cashflow resulting from prepayments, and the dependence of $\hat{C}_i^{pay}$ upon the principal is interpolated. In addition, the average prepayment rate for the aggregate portfolio in the ith month (denoted as $\hat{\gamma}_i$) is derived as a function of $r(i\Delta t)$. Finally, the principal for the (ith+1) month resulting only from the average prepayments in the ith month (denoted as $\hat{p}_i^{net}$) is distinguished from the change in principal resulting from payments in the ith month, and the dependence of $\hat{p}_i^{net}$ upon the principal is interpolated.

The adaptive scenarios are run (steps 105 through 125 as shown in FIG. 1) and the following statistics are extracted, for each time $i\Delta t$ and scenario $\omega$:

$$\text{average prepayment} = \sum_j \frac{\int_{t=i\Delta t}^{(i+1)\Delta t} \gamma_t p_t^j 1[p_t^j \geq 0] dt}{\hat{p}_i} \quad (10)$$

$$\text{total payment} = \sum_j \int_{t=i\Delta t}^{(i+1)\Delta t} \frac{\rho^j e^{\rho^j T}}{e^{\rho^j T} - 1} 1[p_t^j \geq 0] dt \quad (11)$$

where 1 is the indicator function, and j is the index for the $j^{th}$ financial instrument. A functional form for $\gamma_t$ as a function of $r(i\Delta t, \omega)$ may be derived in the following fashion. After graphing the average prepayment in ascending order of $r(i\Delta t, \omega)$, a decreasing piecewise linear function (with, e.g., 5 evenly spaced anchor points) is interpolated from the data to represent $\hat{\gamma}_i(r)$, where $\hat{\gamma}_i(r)$ represents the prepayment rate for the aggregate portfolio. Similarly, the total payment is graphed in ascending order of $\hat{p}_i(\omega)$, to which an increasing piecewise linear function (with, e.g., five evenly spaced anchor points) $\hat{C}_i^{pay}(\hat{p}_i)$ is fitted. Finally, the ratio of $\hat{p}_{i+1}$ over (one minus the average prepayment for the ith month) is plotted in ascending order of $\hat{p}_i$ to linearly interpolate the function $\hat{p}_i^{net}$. The function $\mu$ and $v$ are then defined by:

$$\mu(r, p, i\Delta t) = \hat{C}_i^{pay}(p) + p\hat{\gamma}_i(r) \quad (12)$$

$$v(r, p, i\Delta t) = \hat{p}_i^{net}(p)(1 - \hat{\gamma}_i(r)) \quad (13)$$

It will be understood that the use of 5 anchor points is arbitrary as well as using piecewise linear functions. Other functional forms could be used with varying number of anchor points to approximate the functions $\hat{\gamma}_i(r)$, $\hat{C}_i^{pay}$, and $\hat{p}_i^{net}$.

Figure 2:
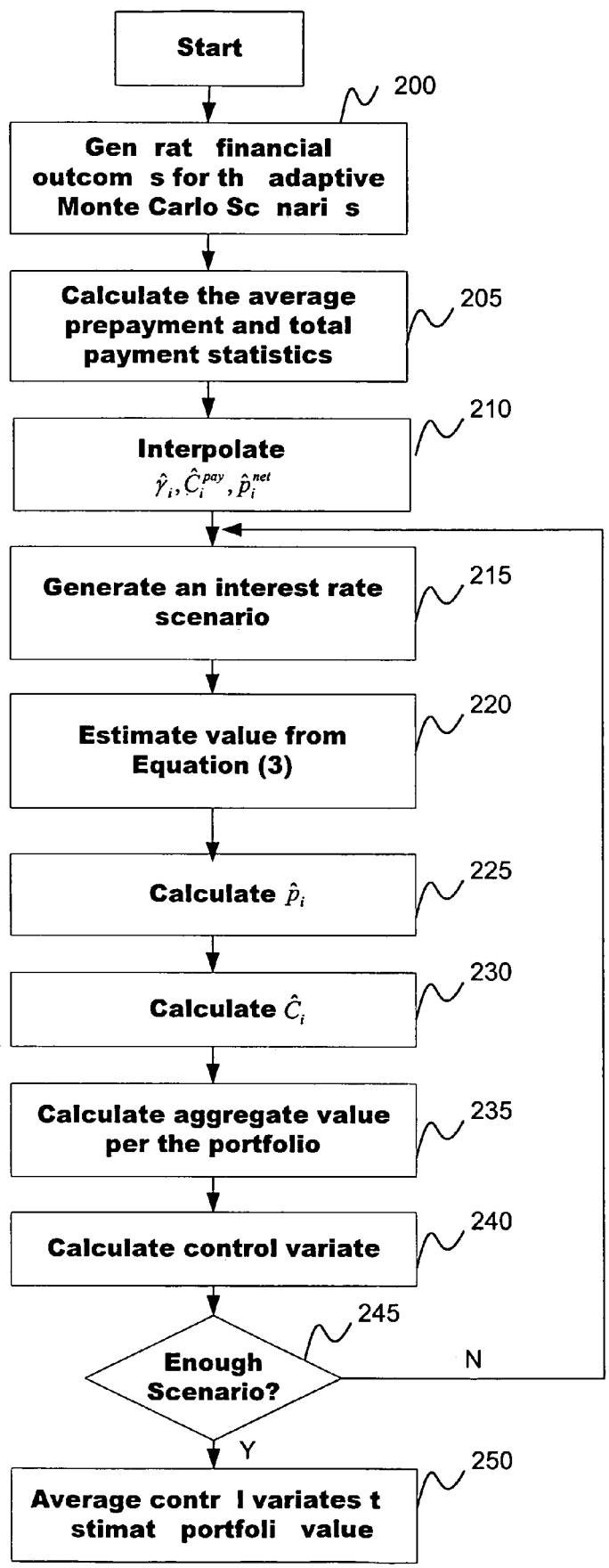
FIG. 2 is a flowchart of a control variate technique according to one embodiment of the invention.

An additional set of Monte Carlo scenarios may be used to form the control variate W of equation (9). A flowchart for the control variate technique of the invention is illustrated in FIG. 2. Upon starting the simulation, the statistics necessary to derive the average prepayment and total payment (equations (10) and (11)) are generated in a set of adaptive Monte Carlo scenarios at step 200. These scenarios are generated in an analogous fashion to steps 105 through 125 described with respect to FIG. 1. The average prepayment and total prepayment may then be calculated using discrete forms of equations (10) and (11) at step 205. At step 210, the functions $\hat{\gamma}_i(r)$, $\hat{C}_i^{pay}(\hat{p}_i)$, and $\hat{p}_i^{net}(\hat{p}^i)$ are interpolated.

To begin calculating the control variate W given by equation (9), the simulation begins another set of Monte Carlo scenarios at step 215 by generating an interest rate scenario at step 215. At step 220, the interest rate scenario is used to calculate a value for the first term in equation (9). This gives a value of the simulated portfolio according to one Monte Carlo simulation as described in steps 110, 115, and 120 with respect to FIG. 1. The value of the simulated aggregated portfolio may now be calculated based upon the interest rate scenario provided by step 215. Note that equation (10) predicts the value for the aggregate principal for the (ith+1) month based upon the interest rate and the aggregate principal for the ith month. Thus, based upon the known starting principal values for the mortgages in the portfolio and the interest rate samples, the aggregate principal values may be sequentially derived using equation (12) at step 225. In turn, the interest rate scenario and the aggregate principal values are substituted into equation (11) to calculate the aggregate cash flow values at step 230. These values are used in a discretized approximation of the second term in equation (9) to give a value of the simulated aggregate portfolio according to one Monte Carlo simulation at step 235. Not illustrated in the flowchart is a step to calculate the expected value of the simulated aggregate portfolio. As will be described further herein, this term may be calculated by a simple Monte Carlo simulation or by a lattice approximation. The resulting expected value and the values from steps 235 and 220 are linearly combined at step 240 to calculate the control variate. Additional Monte Carlo scenarios are repeated at step 245 until the simulation converges to a result at step 250.

The aggregate cash flow and principal given by equations (7) and (8) is a rough approximation of the values given by equation (4)–(5). For instance, it does not capture burnout or index lags. The inventor has discovered, however, that most of the path-dependency of residential mortgages comes from principal amortization. Thus, an inventive solution is to take the approximate principal as a second state variable. This is a relatively optimum selection of state variables since taking more than two state variables complicates the estimation phase, requiring interpolation in more than two dimensions.

A simple Monte Carlo simulation may be used to calculate (with a very large number of scenarios) the expected value term for the control variate since the value of the aggregate portfolio is inexpensive to compute. However, computing the expected value with a lattice, i.e. a sparse representation of a Markov chain, provides a hard bound on the bias so that this technique is preferable. This is possible because the two state variables $(r, \hat{p})$ constitute a joint Markov process.

The lattice approximation of the invention is three dimensional and is an extension of the two-dimensional lattice discussed in Hull, *Options, Futures, and Other Derivatives*, p. 438, =Prentice-Hall, 1997, $3^{rd}$ Ed. to model instruments whose cash flows C depend on the interest rate only. The main features of the latter are now discussed to provide background for the novel lattice approximation of the invention. In Hull and White's two-dimensional lattice, time takes the discrete values $i\Delta t$, and the discretized interest rate process $r_d(i)$ takes the discrete values $\alpha_{i,j} = E[r(i\Delta t)] + j\Delta r$, where the rate-step $\Delta r$ is appropriately chosen for error minimization. The transition probabilities at node (i,j) of the lattice are zero, except for 3 nodes $(i+1, j_{next}-1)$, $(i+1, j_{next})$ and $(i+1, j_{next}+1)$; they are such that the first two moments of the discretized process $r_d$ for the rate equal the first two moments of the process r over a time-step $\Delta t$. To calculate the market value V, equation (3) is discretized:

$$V = \sum_{i=1}^{n} \sum_{j} Q(i, j) C(i\Delta t, j\Delta r) \quad (14)$$

where Q(i,j) is the price of an Arrow-Debreu security that pays 1 if node (i,j) is reached, i.e.:

$$Q(i, j) = E\left[e^{-\sum_{k=0}^{j-1} r_d(k)\Delta t} | r_d(i) = \alpha_{i,j}\right] \quad (15)$$

Note that this lattice has only two dimensions: time (through i) and interest rate (through j). In an embodiment of the lattice used to calculate the expected value term for the control variate, a dimension is added to account for dependence on the principal, such that the node (i,j,k) is a time $i\Delta t$ state where the rate equals $\alpha_{i,j}$ as before, and the principal equals $k\Delta p$ for some value of the principal step $\Delta p$. Conditional on that information, the principal at time $(i+1)\Delta t$ will be equal to $v(\alpha_{i,j}, k\Delta p, i\Delta t)$ because of equation (8). At each node (i,j,k), $k_{next}$ can be determined by rounding, so that:

$$v(\alpha_{i,j}, k\Delta p, i\Delta t) - dp/2 \leq k_{next} dp \leq v(\alpha_{i,j}, k\Delta p, i\Delta t) + dp/2 \quad (16)$$

Since the dynamics of the principal are deterministic between two time-steps, it is only possible to jump from node (i,j,k) to nodes $(i+1, j_{next}+1, k_{next})$, $(i+1, j_{next}, k_{next})$, or $(i+1, j_{next}-1, k_{next})$. The transition probabilities are the same as in the two-dimensional lattice. The market value of the approximate portfolio is then:

$$\sum_{i=1}^{n} \sum_{j} \sum_{k} Q(i, j, k) \mu(j\Delta r, k\Delta p, i\Delta t) \quad (17)$$

where Q(i,j,k) is the price of an Arrow-Debreu security that pays 1 if the node (i,j,k) is reached.

Numerical results. An embodiment of the control variate technique of the invention was tested on a portfolio of 100 mortgages. The test used $p_0^j = j$, $\rho^j = 0.062 + 0.0002\ j - 0.02 * (j/100)^2$ for $j = 1, \ldots, 100$. The rate spread x and the prepayment function $\gamma$ are chosen to be:

$$x = \max\left[\rho^j - \frac{r(i\Delta t) + r((i-1)\Delta t)}{2} - 0.005, 0\right] \quad (18)$$

$$\gamma(i\Delta t) = \begin{cases} \min[0.01 + 10x + 5000x^3, 1]/\Delta t & \text{if } i \leq 4; \\ 0 & \text{otherwise.} \end{cases} \quad (19)$$

The term structure parameters are $\alpha = 0.1$, $\sigma = 0.014$, and the yields of the discount bonds are given in the following Table 1. Cubic splines are used to interpolate these yields in order to fit $\theta$ according to equation (2).

TABLE 1

| | Original Yield Curve | | | | | |
|---|---|---|---|---|---|---|
| Maturity | 0.08 | 0.17 | 0.25 | 0.33 | 0.42 | 1 |
| Yield (in %) | 5 | 5.23 | 6 | 6.2 | 6.5 | 6.5 |

Figure 3:
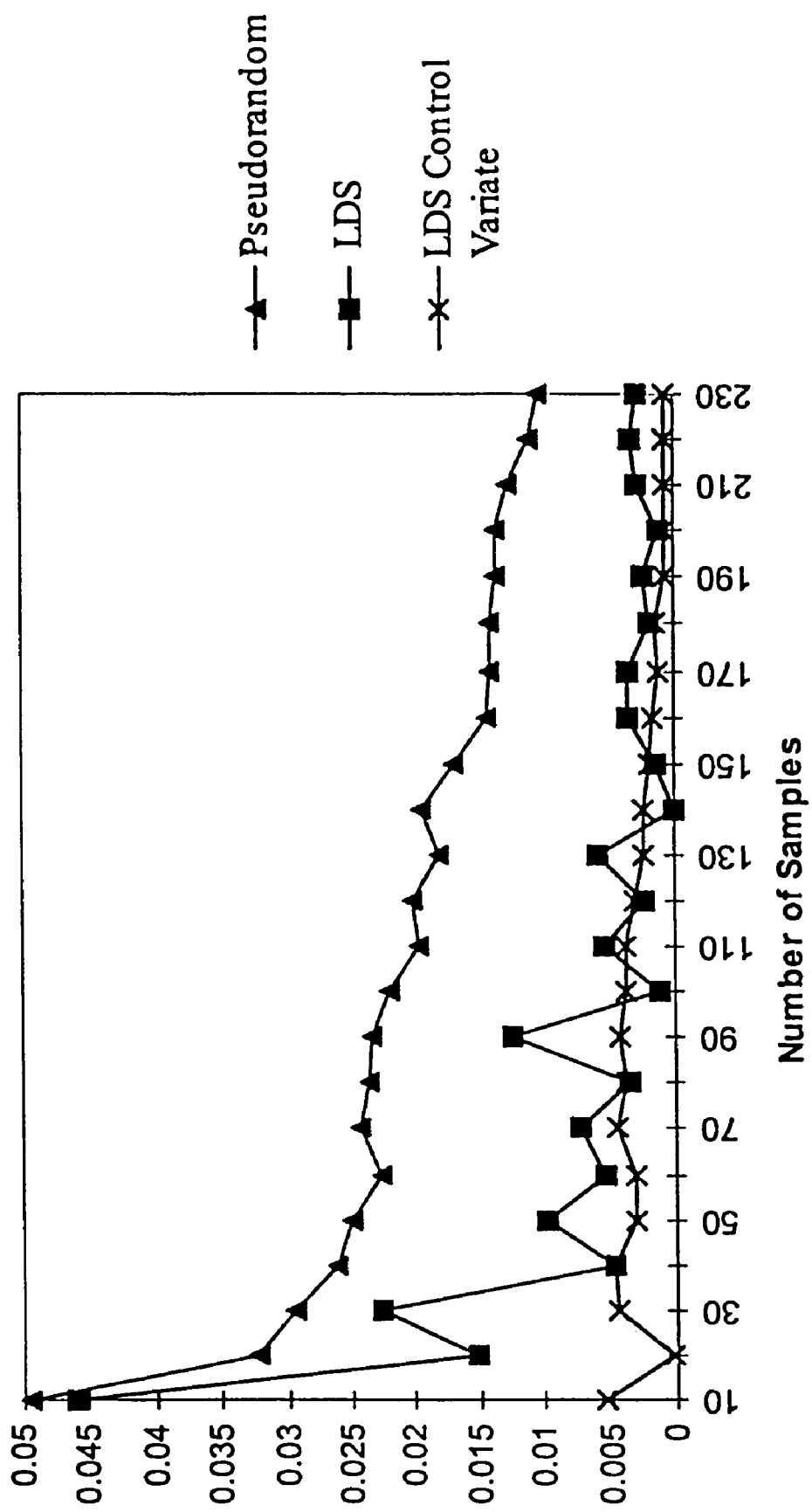
FIG. 3 is a graph comparing data obtained from a Monte Carlo simulation using a control variate technique according to one embodiment of the invention with data obtained form prior art Monte Carlo simulations.

The results are shown in FIG. 3. In this test, the interest rate samples were generated using LDS samples for input into a stochastic interest rate model rather than with a pseudo-random number generator. FIG. 3 compares the absolute value of the relative error (compared to a simulation of 100,000 pseudo-random numbers) of three estimators of the price of the mortgage portfolio: LDS, LDS with control variates, and pseudo-random numbers. For the latter, the average absolute value of the integration error is shown over 10 different seeds. For control variates, the 50 scenarios from the adaptive scenarios were not shown in the results since in practice this data is readily available from previous simulations of the portfolio. As mentioned earlier, the overhead to generate the control variate is negligible. This experiment demonstrates that, for a mortgage portfolio, integration error is about 5 times lower with LDS than with pseudo-random numbers. If control variates with LDS is used, it is about 20 times lower. The variance of the pseudo-random estimator is between 100 and 300 times higher than the variance of the control variate estimator with LDS.

Figure 4:
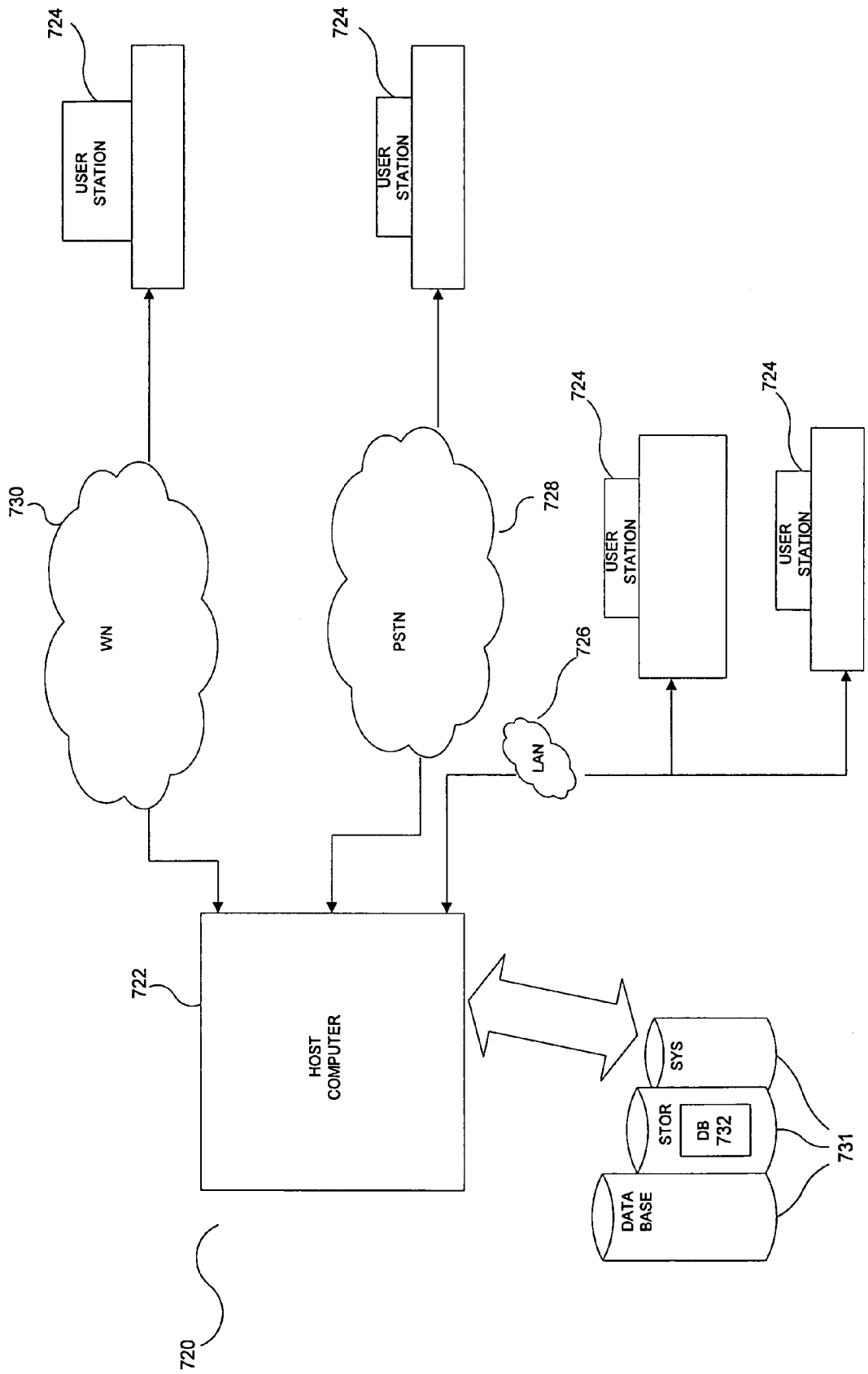
FIG. 4 is a diagram of a computer hardware system with which the present invention can be implemented.

An example computer system for implementing an embodiment of the invention is illustrated in FIG. 4. Referring to FIG. 4, in an embodiment, a computer system 720 includes a host computer 722 connected to a plurality of individual user stations 724. In an embodiment, the user stations 724 each comprise suitable data terminals, for example, but not limited to, e.g., personal computers, portable laptop computers, or personal data assistants ("PDAs"), which can store and independently run one or more applications, i.e., programs. For purposes of illustration, some of the user stations 724 are connected to the host computer 722 via a local area network ("LAN") 726. Other user stations 724 are remotely connected to the host computer 722 via a public telephone switched network ("PSTN") 728 and/or a wireless network 730.

In an embodiment, the host computer 722 operates in conjunction with a data storage system 731, wherein the data storage system 731 contains a database 732 for storing financial information about a portfolio of financial instruments that is readily accessible by the host computer 722. Note that a multiple tier architecture can be employed to connect user stations 724 to a database 732, utilizing for example, a middle application tier (not shown). In alternative embodiments, the database 732 may be resident on the host computer, stored, e.g., in the host computer's ROM, PROM, EPROM, or any other memory chip, and/or its hard disk. In yet alternative embodiments, the database 732 may be read by the host computer 722 from one or more floppy disks, flexible disks, magnetic tapes, any other magnetic medium, CD-ROMs, any other optical medium, punchcards, papertape, or any other physical medium with patterns of holes, or any other medium from which a computer can read. In an alternative embodiment, the host computer 722 can access two or more databases 732, stored in a variety of mediums, as previously discussed.

Figure 5:
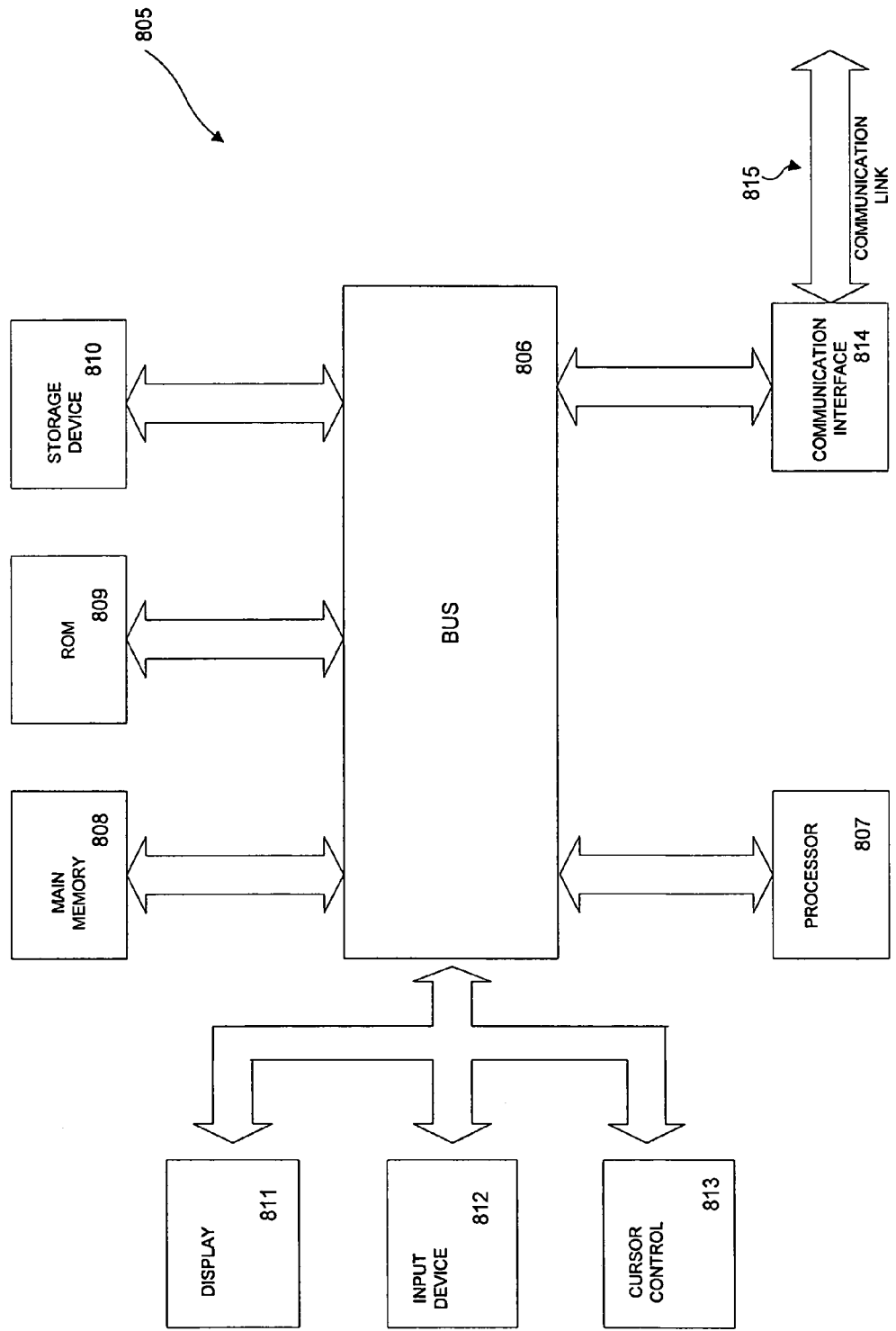
FIG. 5 is an additional diagram of computer hardware system with which the present invention can be implemented.

Referring to FIG. 5, in an embodiment, each user station 724 and the host computer 722, each referred to generally as a processing unit, embodies a general architecture 805. A processing unit includes a bus 806 or other communication mechanism for communicating instructions, messages and data, collectively, information, and one or more processors 807 coupled with the bus 806 for processing information. A processing unit also includes a main memory 808, such as a random access memory (RAM) or other dynamic storage device, coupled to the bus 806 for storing dynamic data and instructions to be executed by the processor(s) 807. The main memory 808 also may be used for storing temporary data, i.e., variables, or other intermediate information during execution of instructions by the processor(s) 807.

A processing unit may further include a read only memory (ROM) 809 or other static storage device coupled to the bus 806 for storing static data and instructions for the processor(s) 807. A storage device 810, such as a magnetic disk or optical disk, may also be provided and coupled to the bus 806 for storing data and instructions for the processor(s) 807.

A processing unit may be coupled via the bus 806 to a display device 811, such as, but not limited to, a cathode ray tube (CRT), for displaying information to a user. An input device 812, including alphanumeric and other keys, is coupled to the bus 806 for communicating information and command selections to the processor(s) 807. Another type of user input device may include a cursor control 813, such as, but not limited to, a mouse, a trackball, a fingerpad, or cursor direction keys, for communicating direction information and command selections to the processor(s) 807 and for controlling cursor movement on the display 811.

According to one embodiment of the invention, the individual processing units perform specific operations by their respective processor(s) 807 executing one or more sequences of one or more instructions contained in the main memory 808, wherein these sequences of instructions carry out the control variate technique of the invention. Such instructions may be read into the main memory 808 from another computer-usable medium, such as the ROM 809 or the storage device 810. Execution of the sequences of instructions contained in the main memory 808 causes the processor(s) 807 to perform the processes described herein. In alternative embodiments, hard-wired circuitry may be used in place of or in combination with software instructions to implement the invention. Thus, embodiments of the invention are not limited to any specific combination of hardware circuitry and/or software.

The term "computer-usable medium," as used herein, refers to any medium that provides information or is usable by the processor(s) 807. Such a medium may take many forms, including, but not limited to, non-volatile, volatile and transmission media. Non-volatile media, i.e., media that can retain information in the absence of power, includes the ROM 809. Volatile media, i.e., media that can not retain information in the absence of power, includes the main memory 808. Transmission media includes coaxial cables, copper wire and fiber optics, including the wires that comprise the bus 806. Transmission media can also take the form of carrier waves; i.e., electromagnetic waves that can be modulated, as in frequency, amplitude or phase, to transmit information signals. Additionally, transmission media can take the form of acoustic or light waves, such as those generated during radio wave and infrared data communications.

Common forms of computer-usable media include, for example: a floppy disk, flexible disk, hard disk, magnetic tape, any other magnetic medium, CD-ROM, any other optical medium, punchcards, papertape, any other physical medium with patterns of holes, RAM, ROM, PROM (i.e., programmable read only memory), EPROM (i.e., erasable programmable read only memory), including FLASH-EPROM, any other memory chip or cartridge, carrier waves, or any other medium from which a processor 807 can retrieve information.

Various forms of computer-usable media may be involved in providing one or more sequences of one or more instructions to the processor(s) 807 for execution. For example, the instructions may initially be provided on a magnetic disk of a remote computer (not shown). The remote computer may load the instructions into its dynamic memory and then transit them over a telephone line, using a modem. A modem local to the processing unit may receive the instructions on a telephone line and use an infrared transmitter to convert the instruction signals transmitted over the telephone line to corresponding infrared signals. An infrared detector (not shown) coupled to the bus 806 may receive the infrared signals and place the instructions therein on the bus 806. The bus 806 may carry the instructions to the main memory 808, from which the processor(s) 807 thereafter retrieves and executes the instructions. The instructions received by the main memory 808 may optionally be stored on the storage device 810, either before or after their execution by the processor(s) 807.

Each processing unit may also include a communication interface 814 coupled to the bus 806. The communication interface 814 provides two-way communication between the respective user stations 824 and the host computer 822. The communication interface 814 of a respective processing unit transmits and receives electrical, electromagnetic or optical signals that include data streams representing various types of information, including instructions, messages and data.

A communication link 815 links a respective user station 824 and a host computer 822. The communication link 815 may be a LAN 726, in which case the communication interface 814 may be a LAN card. Alternatively, the communication link 815 may be a PSTN 728, in which case the communication interface 814 may be an integrated services digital network (ISDN) card or a modem. Also, as a further alternative, the communication link 815 may be a wireless network 730.

A processing unit may transmit and receive messages, data, and instructions, including program, i.e., application, code, through its respective communication link 815 and communication interface 814. Received program code may be executed by the respective processor(s) 807 as it is received, and/or stored in the storage device 810, or other associated non-volatile media, for later execution. In this manner, a processing unit may receive messages, data and/or program code in the form of a carrier wave.

Those of ordinary skill will appreciate that many different embodiments of the invention may be constructed. Thus, it is understood that other embodiments of the present invention can be fabricated and be within the spirit and scope of the appended claims.

What is claimed is:

1. A method for financial estimation, the method comprising:
    (a) providing a portfolio of financial instruments on a database in a computing network, the instruments having a schedule of payment times;
    (b) generating a plurality of interest rate scenarios by Monte Carlo simulation using a stochastic term structure and storing the plurality of interest rate scenarios on computer readable medium;
    (c) calculating, for each financial instrument, a set of financial outcomes using a subset of the plurality of stored interest rate scenarios;
    (d) interpolating, from the sets of financial outcomes, a first function that estimates an aggregate value of the portfolio when sampled at the payment times with an aggregate principal of the portfolio and a first interest rate scenario;
    (e) providing a second function that estimates a value for a financial instrument from the portfolio when sampled at the payment times using a second interest rate scenario;
    (f) using an interest rate scenario from the plurality of stored interest rate scenarios, calculating a value of the second function for each financial instrument in the portfolio and a value of the first function to estimate, respectively, a value for the portfolio and an aggregate value for the portfolio;
    (g) forming a control variate based upon the estimated value of the portfolio, the estimated aggregated value of the portfolio, and an expected value of the aggregate value of the portfolio; and
    (h) managing the portfolio based on the control variate.

2. The method of claim 1, further comprising:
    repeating (e) through (g); and
    averaging the resulting control variates to estimate a value for the portfolio.

3. The method of claim 2, wherein the interest rate scenarios used in the repetition of (e) through (f) do not belong to the subset of interest rate scenarios used in (c).

4. The method of claim 3, wherein (d) comprises:
    deriving an average prepayment for the portfolio as a function of the interest rate;
    deriving a third function giving the cashflow not resulting from prepayments for the portfolio as a function of the principal of the portfolio; and
    deriving a fourth function giving the principal of the portfolio at an (i+1)th payment time based upon the change in principal predicted by the value of the average prepayment for the portfolio at an ith payment time.

5. The method of claim 4, wherein the aggregate principal at the (i+1)th payment time is given as the value of the fourth function minus the product of the fourth function times the average prepayment at the ith payment time.

6. The method of claim 5, wherein an aggregate cashflow at the ith payment time is given as a sum of the third function and the product of the aggregate principal times the average prepayment at the ith payment time.

7. The method of claim 6, wherein the first function is a function of the aggregate cashflow.

8. A method for financial estimation of a portfolio of financial instruments, the method comprising:
    (a) providing a first function giving an aggregate value for the portfolio;
    (b) providing a second function giving a value for a financial instrument within the portfolio;
    (c) using an interest rate scenario, calculating a value for the portfolio using the second function and the aggregate value for the portfolio using the first function;
    (d) forming a control variate based upon the value of the portfolio, the aggregate value for the portfolio, and an expected value of the aggregate value for the portfolio; and
    (e) estimating the value of the portfolio based on the control variate.

9. The method of claim 8, wherein the first function gives an aggregate value for the portfolio as a function of an aggregate principal of the portfolio and an interest rate scenario.

10. A computer program product that includes a computer-usable medium, the medium having stored thereon a sequence of instructions which, when executed by a processor, causes the processor to execute a process for financial estimation, said process comprising:
    (a) providing a portfolio of financial instruments having a schedule of payment times;
    (b) generating a plurality of interest rate scenarios by Monte Carlo simulation using a stochastic term structure;
    (c) calculating, for each financial instrument, a set of financial outcomes using a subset of interest rate scenarios;
    (d) interpolating, from the sets of financial outcomes, a first function that estimates the aggregate value of the portfolio when sampled at the payment times with an aggregate principal of the portfolio and a first interest rate scenario;
    (e) providing a second function that estimates a value for a financial instrument from the portfolio when sampled at the payment times using a second interest rate scenario;
    (f) using an interest rate scenario from the plurality of interest rate scenarios, calculating a value of the second function for each financial instrument in the portfolio and a value of the first function to estimate, respectively, a value for the portfolio and an aggregate value for the portfolio;
    (g) forming a control variate based upon the estimated value of the portfolio, the estimated aggregated value of the portfolio, and an expected value of the aggregate value of the portfolio; and
    (h) managing the portfolio based on the control variate.

11. The computer program product of claim 10, wherein said process further comprises:
   repeating (e) through (g); and
   averaging the resulting control variates to estimate a value for the portfolio.

12. The computer program product of claim 11, wherein the interest rate scenarios used in the repetition of (e) through (f) do not belong to the subset of interest rate scenarios used in (c).

13. The computer program product of claim 12, wherein (d) comprises:
   deriving an average prepayment for the portfolio as a function of the interest rate;
   deriving a third function giving the cashflow not resulting from prepayments for the portfolio as a function of the principal of the portfolio; and
   deriving a fourth function giving the principal of the portfolio at an (i+1)th payment time based upon the change in principal predicted by the value of the average prepayment for the portfolio at an ith payment time.

14. The computer program product of claim 13, wherein the aggregate principal at the (i+1)th payment time is given as the value of the fourth function minus the product of the fourth function times the average prepayment at the ith payment time.

15. The computer program product of claim 14, wherein an aggregate cashflow at the ith payment time is given as a sum of the third function and the product of the aggregate principal times the average prepayment at the ith payment time.

16. The computer program product of claim 15, wherein the first function is a function of the aggregate cashflow.

17. A computer program product that includes a computer-usable medium, the medium having stored thereon a sequence of instructions which, when executed by a processor, causes the processor to execute a process for financial estimation of a portfolio of financial instruments, the process comprising:
   (a) providing a first function giving an aggregate value for the portfolio;
   (b) providing a second function giving a value for a financial instrument within the portfolio;
   (c) using an interest rate scenario, calculating a value for the portfolio using the second function and the aggregate value for the portfolio using the first function;
   (d) forming a control variate based upon the value of the portfolio, the aggregate value for the portfolio, and an expected value of the aggregate value for the portfolio; and
   (e) estimating the value of the portfolio based on the control variate.

18. The computer program product of claim 17, wherein the first function gives an aggregate value for the portfolio as a function of an aggregate principal of the portfolio and an interest rate scenario.

19. A system for financial estimation, the system comprising:
   (a) means for providing a portfolio of financial instruments having a schedule of payment times;
   (b) means for generating a plurality of interest rate scenarios by Monte Carlo simulation using a stochastic term structure;
   (c) means for calculating, for each financial instrument, a set of financial outcomes using a subset of interest rate scenarios;
   (d) means for interpolating, from the sets of financial outcomes, a first function that estimates the aggregate value of the portfolio when sampled at the payment times with an aggregate principal of the portfolio and a first interest rate scenario;
   (e) means for providing a second function that estimates a value for a financial instrument from the portfolio when sampled at the payment times using a second interest rate scenario;
   (f) means for using an interest rate scenario from the plurality of interest rate scenarios, calculating a value of the second function for each financial instrument in the portfolio and a value of the first function to estimate, respectively, a value for the portfolio and an aggregate value for the portfolio;
   (g) means for forming a control variate based upon the estimated value of the portfolio, the estimated aggregated value of the portfolio, and an expected value of the aggregate value of the portfolio; and
   (h) means for managing the portfolio based on the control variate.

20. The system of claim 19, further comprising:
   means for repeating (e) through (g); and
   means for averaging the resulting control variates to estimate a value for the portfolio.

21. The system of claim 20, wherein the interest rate scenarios used in the repetition of (e) through (f) do not belong to the subset of interest rate scenarios used in (c).

22. The system of claim 21, wherein (d) comprises:
   means for deriving an average prepayment for the portfolio as a function of the interest rate;
   means for deriving a third function giving the cashflow not resulting from prepayments for the portfolio as a function of the principal of the portfolio; and
   means for deriving a fourth function giving the principal of the portfolio at an (i+1)th payment time based upon the change in principal predicted by the value of the average prepayment for the portfolio at an ith payment time.

23. The system of claim 22, wherein the aggregate principal at the (i+1)th payment time is given as the value of the fourth function minus the product of the fourth function times the average prepayment at the ith payment time.

24. The system of claim 23, wherein an aggregate cashflow at the ith payment time is given as a sum of the third function and the product of the aggregate principal times the average prepayment at the ith payment time.

25. The system of claim 24, wherein the first function is a function of the aggregate cashflow.

26. A system for financial estimation of a portfolio of financial instruments, the system comprising:
   (a) means for providing a first function giving an aggregate value for the portfolio;
   (b) means for providing a second function giving a value for a financial instrument within the portfolio;
   (c) means for using an interest rate scenario, calculating a value for the portfolio using the second function and the aggregate value for the portfolio using the first function;
   (d) means for forming a control variate based upon the value of the portfolio, the aggregate value for the portfolio, and an expected value of the aggregate value for the portfolio; and
   (e) means for estimating the value of the portfolio based on the control variate.

27. The system of claim 26, wherein the first function gives an aggregate value for the portfolio as a function of an aggregate principal of the portfolio and an interest rate scenario.

28. A computer implemented method for financial estimation, the method comprising:
   (a) providing a portfolio of financial instruments having a schedule of payment times;
   (b) generating a plurality of interest rate scenarios by Monte Carlo simulation using a stochastic term structure;
   (c) calculating, for each financial instrument, a set of financial outcomes using a subset of interest rate scenarios;
   (d) interpolating, from the sets of financial outcomes, a first function that estimates the aggregate value of the portfolio when sampled at the payment times with an aggregate principal of the portfolio and a first interest rate scenario;
   (e) providing a second function that estimates a value for a financial instrument from the portfolio when sampled at the payment times using a second interest rate scenario;
   (f) using an interest rate scenario from the plurality of interest rate scenarios, calculating a value of the second function for each financial instrument in the portfolio and a value of the first function to estimate, respectively, a value for the portfolio and an aggregate value for the portfolio;
   (g) forming a control variate based upon the estimated value of the portfolio, the estimated aggregated value of the portfolio, and an expected value of the aggregate value of the portfolio; and
   (h) estimating the value of the portfolio based on the control variate.

29. The method of claim 28, further comprising:
   repeating (e) through (g); and
   averaging the resulting control variates to estimate a value for the portfolio.

30. The method of claim 29, wherein the interest rate scenarios used in the repetition of (e) through (f) do not belong to the subset of interest rate scenarios used in (c).

31. The method of claim 30, wherein (d) comprises:
   deriving an average prepayment for the portfolio as a function of the interest rate;
   deriving a third function giving the cashflow not resulting from prepayments for the portfolio as a function of the principal of the portfolio; and
   deriving a fourth function giving the principal of the portfolio at an (i+1)th payment time based upon the change in principal predicted by the value of the average prepayment for the portfolio at an ith payment time.

32. The method of claim 31, wherein the aggregate principal at the (i+1)th payment time is given as the value of the fourth function minus the product of the fourth function times the average prepayment at the ith payment time.

33. The method of claim 32, wherein an aggregate cashflow at the ith payment time is given as a sum of the third function and the product of the aggregate principal times the average prepayment at the ith payment time.

34. The method of claim 33, wherein the first function is a function of the aggregate cashflow.

35. A computer implemented method for financial estimation of a portfolio of financial instruments, the method comprising:
   (a) providing a first function giving an aggregate value for the portfolio;
   (b) providing a second function giving a value for a financial instrument within the portfolio;
   (c) using an interest rate scenario, calculating a value for the portfolio using the second function and the aggregate value for the portfolio using the first function;
   (d) forming a control variate based upon the value of the portfolio, the aggregate value for the portfolio, and an expected value of the aggregate value for the portfolio; and
   (e) estimating the value of the portfolio based on the control variate.

36. The method of claim 35, wherein the first function gives an aggregate value for the portfolio as a function of an aggregate principal of the portfolio and an interest rate scenario.

* * * * *